(12) United States Patent
Washizu et al.

(10) Patent No.: US 6,919,560 B2
(45) Date of Patent: Jul. 19, 2005

(54) OPTICAL SCANNING APPARATUS

(75) Inventors: Masao Washizu, Tokyo (JP); Koji Horio, Kanagawa (JP)

(73) Assignees: Moritex Corporation, Tokyo (JP); National Agriculture and Bio-Oriented Research Organization, Ibaraki (JP)

( * ) Notice: Subject to any disclaimer, the term of this patent is extended or adjusted under 35 U.S.C. 154(b) by 291 days.

(21) Appl. No.: 10/373,856

(22) Filed: Feb. 27, 2003

(65) Prior Publication Data

US 2003/0160161 A1 Aug. 28, 2003

(30) Foreign Application Priority Data

Feb. 28, 2002 (JP) ........................................ 2002-053281

(51) Int. Cl.[7] .......................... H01J 3/14; H01J 40/14; H01J 5/16
(52) U.S. Cl. ........................ 250/234; 250/235; 359/385
(58) Field of Search ................................. 250/234, 235, 250/239; 359/368, 385; 356/205, 318; 362/575, 553, 554, 368, 372, 362, 366

(56) References Cited

U.S. PATENT DOCUMENTS 6,294,775 B1 * 9/2001 Seibel et al. ............. 250/208.1
6,845,190 B1 * 1/2005 Smithwick et al. ........... 385/25

FOREIGN PATENT DOCUMENTS

| JP | 01031116 A | * | 2/1989 | ........... G02B/26/10 |
| JP | 09243944 A | * | 9/1997 | ........... G02B/26/10 |

* cited by examiner

Primary Examiner—Thanh X. Luu
Assistant Examiner—Seung C. Sohn
(74) Attorney, Agent, or Firm—Greenblum & Bernstein, P.L.C.

(57) ABSTRACT

An optical scanning apparatus including an optical system of refracting an illumination light illuminated from a light source device by a scanning lens into parallel optical beams and condensing the light by a condensing lens located at a focal position of the scanning lens on an observed surface, in which the light source device has a light emission portion attached to a stage which is adjustable for the position along an XY plane in perpendicular to the optical axis of the scanning lens, with an optical axis of irradiation light being in parallel with the optical axis of the scanning lens. The apparatus being small in the size and simple in the structure, capable of easily controlling the spot position, not requiring accurate optical axis alignment and manufactured at a reduced cost.

5 Claims, 4 Drawing Sheets

OPTICAL SCANNING APPARATUS

BACKGROUND OF THE INVENTION

1. Field of the Invention

The present invention concerns an optical scanning apparatus for moving an optical spot to an optional position in a region observed under the visual field of a microscope.

2. Statement of the Related Art

Optical scanning apparatus, particularly, laser scanning apparatus using laser light sources have been used for laser manipulation of displacing a micro specimen captured by irradiation of a laser light to an optional position, or microscopic laser fabrication of irradiating a laser light to biological tissues under the visual field of a microscope to conduct fabrication such as heating or cutting and they have an extensive range of application use.

An existent laser scanning apparatus 21 shown in FIG. 5 has an optical system including an optical axis LX irradiated from a semiconductor laser 22 incorporating a collimator lens 24 to a condensing lens 23 for condensing the light on an observed plane OS, along which, are arranged galvano mirrors 25X and 25Y for deflecting the laser light upward or downward and leftward or rightward relative to the optical axis LX, a scanning lens 26A for refracting the laser light deflected upward and downward and leftward or rightward in parallel with the optical axis, and a second scanning lens 26B for collimating the laser beam and refracting it to the condensing lens 23.

In the constitution described above, since the first and the second scanning lenses 26A and 26B are interposed between the galvano mirrors 25X and 25Y, and the condensing lens 23, when the light displaced by inclining the galvano mirrors 25X and 25Y each at a predetermined angle is condensed by the condensing lens 23, the amount of displacement of a laser spot can be reduced and the spot can be moved by a micro distance, so that the laser spot can be scanned under the visual field of a microscope.

Generally, since the first and the second scanning lenses 26A and 26B use two convex lenses of an identical focal length f which are arranged such that respective focal positions are aligned with each other, the distance between the lenses is twice the focal lens f and the condensing lens 23 is positioned at the focal position of the second scanning lens 26B.

Usually, the distance between the first scanning lens 26A and galvano mirror 25Y is kept at or longer than the focal length f of the first scanning lens 26A or more and the distance from the galvano mirror 25X to the semiconductor laser 22 is also kept at about a focal length of the first scanning lens 26A.

Accordingly, the length of the laser scanning apparatus 21 form the semiconductor laser 22 to the condensing lens 23 requires four times the focal length to bring about a problem of increasing the size of the apparatus.

Particularly, when the laser scanning device 21 is assembled into an inverted microscope 31, it is connected with a connection port 35A (35B) formed on the side (or back) of the microscope 31 as shown in FIG. 6.

In this case, an objective 32 of the microscope 31 is used as the condensing lens 23 and a branched optical axis $SX_1$ ($SX_2$) branched from an optical axis MX from the objective 32 to an eyepiece 33 by a half-mirror 34A (34B) is aligned with the optical axis LX of a laser scanning apparatus 21.

Accordingly, the optical channel length from the objective 32 by way of the half-mirror 34A (34B) to the second scanning lens 26B is just equal with the focal length of the second scanning lens 26B. In this case, since it is necessary for the focal length: about f≈20 cm at the shortest, the entire length of the apparatus exceeds 1 m.

In view of the above, the present inventors et al. have experimentally manufactured a small-sized laser scanning apparatus as shown in FIG. 7. The apparatus has an optical system including an optical axis LX from a semiconductor laser 22 incorporating a collimator lens 24 for illuminating a laser light to a condensing lens 23 for condensing the irradiated light on an observed plane OS, along which are arranged a concave lens 42 for diverging the laser light, a focusing lens 43 for focusing diverged light, galvano mirrors 25X and 25Y for deflecting the focused light upward or downward and leftward or rightward relative to the optical axis LX, and a scanning lens 44 for collimating and then refracting the laser light deflected upward or downward and rightward or leftward to the condensing lens 23.

Respective optical elements are arranged so as to satisfy the relation:

$$b = f_{11}a/(a-f_{11})$$

$$f_{13} = -\{f_{11}f_{12}/(f_{11}-f_{12})-c\}$$

where $f_{13}$ represents a focal length of a concave lens 42,
$f_{12}$ represents a focal length of a focusing lens 43,
$f_{11}$ represents a focal length of a scanning lens 44,
c represents a distance between the concave lens 42 and the focusing lens 43,
b represents a distance between the galvano mirror 25Y and the scanning lens 44, and
a represents a distance between the scanning lens 44 and the condensing lens 23.

With the constitution described above, since one scanning lens 44 may suffice, the length from the semiconductor laser 22 to the condensing lens 23 can be shortened to make the size of the entire apparatus smaller.

However, in any of the cases, since the position of the laser spot is determined by the angle of inclination of the galvano mirrors 25X and 25Y, the control is troublesome. In addition, since high accuracy is required for the alignment of optical axes upon assembling, it involves problem of making manufacture troublesome, increasing the manufacturing cost and poor yield.

Further, since existent laser scanning apparatus 21 or 41 uses large a number of lenses, the alignment for optical axes is troublesome by so much and, particularly, high accuracy is required for the alignment of optical axes with the galvano mirrors 25X and 25Y.

In view of the above, the present invention has a technical subject of providing an optical scanning apparatus which is small in the size and simple in the structure, can be controlled easily, requires no high accuracy for the alignment of the optical axes, and can reduce the manufacturing cost as well.

SUMMARY OF THE INVENTION

The foregoing subject can be attained in accordance with a first feature of the invention by an optical scanning apparatus including an optical system of refracting an illumination light illuminated from a light source device by a scanning lens into parallel optical beams and condensing the light by a condensing lens located at a focal position of the scanning lens on an observed surface, in which the light source device has a light emission portion attached to a stage which is adjustable for the position along an XY plane in perpendicular to the optical axis of the scanning lens, with an optical axis of irradiation light being in parallel with the optical axis of the scanning lens.

According to the first feature of the invention, a light illuminated from the light emission portion such as a light emitting device is advanced in parallel with the optical axis of the scanning lens, then refracted by the scanning lens into parallel optical beams directing to the focal point of the lens and then condensed through the condensing lens located at a focal position on the observed plane to form an optical spot.

In this constitution, since the light emission portion is attached to the stage which is adjustable for the position along the XY plane in perpendicular to the optical axis of the scanning lens, the incident position to the scanning lens is moved by adjusting the position of the stage, and the incident angle of the parallel optical beams incident to the condensing lens is changed in accordance with the amount of displacement, thereby displacing the optical spot condensed on the observed plane.

Since the position of the laser spot can be adjusted in the direction XY by positional adjustment for the direction XY as described above, control is facilitated. In addition, since there is no requirement for using the galvano mirrors, alignment at high accuracy for the optical axis is not required, which simplifies the manufacture and reduces the manufacturing cost. Further, since one scanning lens may suffice, the entire optical system can be reduced in the size.

In accordance with the second feature of the invention, a concave lens for diverging an illumination light illuminated from the light emission portion and entering the light into the scanning lens is attached integrally to the light emission portion, and the concave lens is attached between the scanning lens and the focal plane thereof such that the focal point of the concave lens situates at the focal plane of the scanning lens on the side of the light source.

According to the second feature of the invention, since the light emission portion can be disposed in the vicinity of the scanning lens and a concave lens of small diameter can be used, the size of the apparatus can be made further smaller.

In the third feature of the invention, a focusing lens for focusing illumination light from the light emission portion and then entering the light into the scanning lens is attached integrally to the light emission portion and disposed such that the focal point of the focusing lens is situated near the focal plane of the scanning lens on the side of the light source.

In accordance with the third feature of the invention, since the illumination light is focused on the focal point of the scanning lens, beam shaping is facilitated, for example, by providing a pin hole at the focusing position.

Further, in accordance with a forth feature of the invention, when the focusing lens is disposed movably forward and backward in the direction of the optical axis, the depth of focus of an optical spot can be adjusted in accordance with the position of the focusing lens.

In accordance with a fifth aspect of the invention, an optical fiber for guiding the illumination light illuminated from an illumination light source is used for the light emission portion of the light source device, so that the arrangement on the stage is more simplified and, when an observed light returning in the optical fiber from the observed surface through an identical optical channel with that for the illumination light is branched by an optical brancher and detected by an optical detector, the system can be used also as a cofocal microscope.

DESCRIPTION OF THE ACCOMPANYING DRAWINGS

Preferred embodiments of this invention will be described in details with reference to the drawings, wherein FIG. 1 is an explanatory view showing an optical scanning apparatus according to the invention;

DESCRIPTION OF PREFERRED EMBODIMENTS

The present invention is to be described more specifically for preferred embodiments with reference to the drawings.

Figure 1:
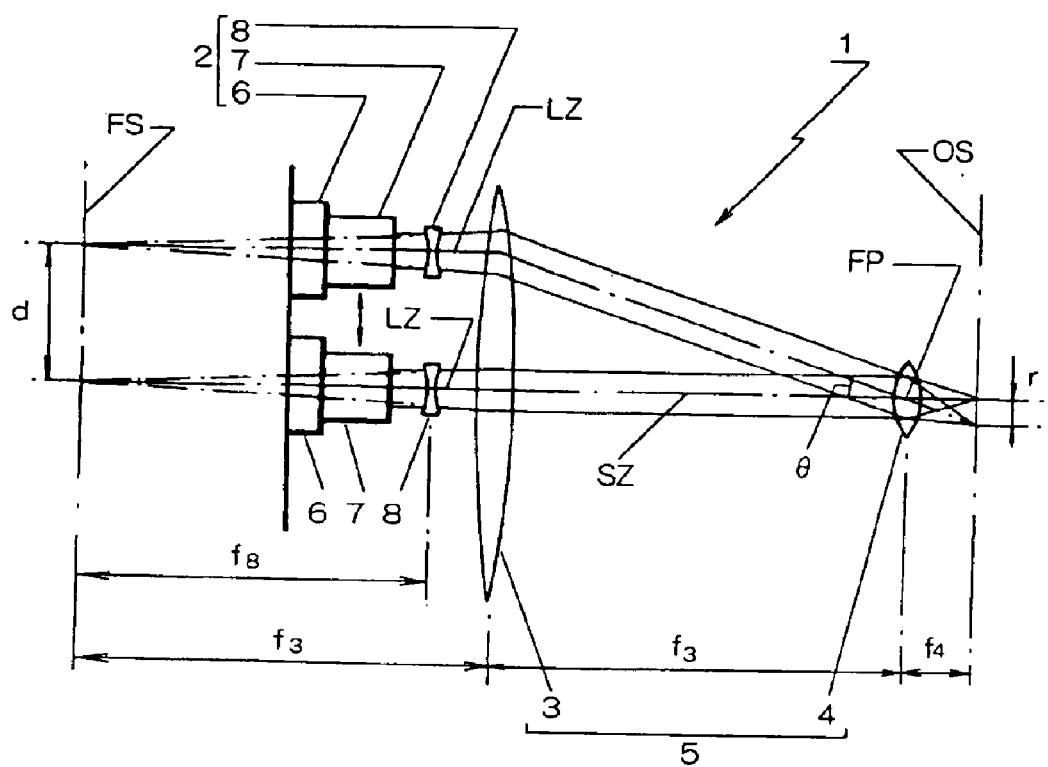

As shown in FIG. 1, an optical scanning apparatus 1 of this embodiment comprises an optical system 5 for entering an illumination light from a light source device 2 to a scanning lens 3, thereby forming parallel optical beams directing to a condensing lens 4 located at a focal position FP of the lens 3 and condensing the beams through the condensing lens 4 onto the observed plane OS.

The light source device 2 has a semiconductor laser (light emission portion) 7 attached to a stage 6 which is adjustable for the position along an XY plane in perpendicular to an optical axis SZ of the scanning lens 3, with an optical axis LZ of illumination light being in parallel with an optical axis SZ of the scanning lens, and a concave lens 8 integrally attached to a semiconductor laser 7 for diverging the laser light and entering the light under diversion into the scanning lens 3.

The concave lens 8 is located between the scanning lens 3 and the focal plane FS thereof such that the focal point $FP_8$ situates on the focal plane FS of the scanning lens 3 on the side of the light source.

That is, the distance between the concave lens 8 and the scanning lens 3 is equal with the difference between the focal lengths $f_8$, $f_3$ for each of the lenses, and the distance between the scanning lens 3 and the condensing lens 4 is equal with the focal length $f_3$ of the scanning lens 3.

Further, a lens having the focal length shorter than that of the scanning lens 3 is selected for the condensing lens 4.

In this case, the following relations are established:

$$d=f_3\theta$$

$$r=f_4\theta$$

where r represents the amount of displacement of a laser spot on the observed plane OS relative to the amount of displacement d of the semiconductor laser 7 from the optical axis SZ and θ (rad) represents the incident angle of the laser light to the condensing lens 4, and they lead to the following relation:

$$r/d=f_4/f_3.$$

When an objective lens having a magnification factor of 100×, focal distance $f_4$=1.8 mm and as a condensing lens 4 and d and r are set as: d=2778 µm and r=50 µm, the focal length $f_3$ of the scanning lens is defined as:

$$f_3 = f_4 d/r = 1.8 \times 2778/50 = 100 \text{ (mm)}$$

When a concave lens 8 having a focal length of −75 mm is used, the distance between the semiconductor laser 7 and the condensing lens 4 is 25 mm or shorter and, even when a scanning lens 3 of a relatively long focal length $f_3$ is used, the entire length of the apparatus including the stage 6 is within the length twice or less of the focal length $f_3$ thereof.

Since the entire length can be made extremely shorter as described above, when an objective 12 of an inverted microscope 11 is used as the condensing lens 4 and a half-mirror 14 is disposed inside of a revolver 13 for the objective 12, the optical scanning apparatus 1 can be directly coupled with the lateral circumference thereof.

The foregoings show the constitution for an example of the invention and the operation is to be explained.

When the semiconductor laser 7 situates on the optical axis SZ of the scanning lens 3, a laser light from the semiconductor laser 7 transmitting through an incorporated collimator lens (not illustrated) is formed into parallel optical beams and advanced along the optical axis SZ, and the beam diameter thereof is diverged through the concave lens 8 and then entered into the scanning lens 3.

Since the focal point of the concave lens 8 is on the focal plane FS of the scanning lens 3, the laser light travels along the same optical trace as that diverged from the focal point of the scanning lens 3 and incident, and the transmission light is incident as parallel optical beam rightly into the condensing lens 4 and the light transmitting the condensing lens 4 is condensed to the focal position to form an optical spot.

Then, when the stage 6 is moved to displace the semiconductor laser 7 from the optical axis SZ of the scanning lens 3, the laser light from the semiconductor laser 7 transmitting through the incorporated collimator lens (not illustrated) is formed into parallel optical beams and advanced in parallel with the optical axis SZ, diverged through the concave lens 8 and then incident to the scanning lens 3.

Since the focal point of the concave lens 8 situates on the focal plane FS of the scanning lens 3, the laser light travels along the same optical traces as that diverged from the Focal plane FS and incident, and the transmission light is entered as parallel light beams to the condensing lens 4 at a predetermined angle of incident θ, and the light transmitting the condensing lens 4 is condensed at a position displaced from the focal position on the observed surface OS to form an optical spot.

Assuming the XY displacement amount of the semiconductor laser 7 as $d_x$, $d_y$, the amounts of displacement $r_x$, $r_y$ of the optical spot are represented based on the ratio $f_4/f_3$ for the focal distances of the scanning lens 3 and the condensing lens 4 as below:

$$r_x = d_x f_4/f_3$$

$$r_y = d_y f_4/f_3$$

Figure 3:
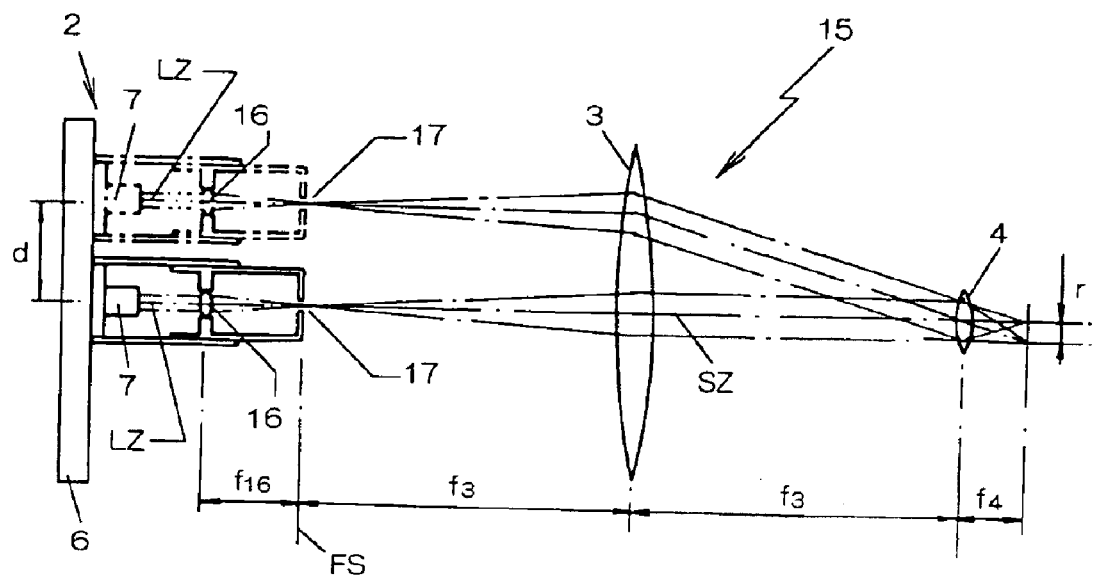
FIG. 3 is an explanatory view showing another embodiment of the apparatus.

As described above, when the semiconductor laser 7 is displaced in the direction XY by moving the stage 6, the optical spot formed on the observed plane OS is displaced in the direction XY in proportion with the amount of displacement of the semiconductor laser and, in addition, since there is a relation for the focal length as: $f_4 < f_3$, the amount of displacement is reduced by a reduction ration in accordance with the ratio of the focal distance, so that the control for the stage 6 for displacing the optical spot to an optional position becomes extremely simple FIG. 3 is an explanatory view showing another embodiment. Portions in common with those in FIG. 1 carry the same reference numerals for which detailed explanations are to be omitted.

A light source device 2 used for an optical scanning apparatus 15 of this embodiment has a semiconductor laser (light emission device) 7 attached to a stage 6 which is adjustable for the position along an XY plane in perpendicular to the optical axis XZ of a scanning lens 3, with the optical axis LZ of the illumination light being in parallel with the optical axis XZ of the scanning lens 3, and the focusing lens 16 attached for focusing the laser light on the focal plane FS of the scanning lens 3 and then entering the light to the scanning lens 3.

The focusing lens 16 is disposed moveably forward and backward along the optical axis LZ of the illumination light from the semiconductor laser 7, and a pin hole 17 is formed at a focal position of the lens.

When the stage 6 is moved in the direction XY, the focusing lens 6 and the pin hole 17 move integrally with the semiconductor laser 7 in the direction XY and, when the focusing lens 16 is moved forward and backward, the pin hole 17 moves integrally with the focusing lens 16 forward and backward.

The distance between the focusing lens 16 and the scanning lens 3 when the focusing lens 16 is situated on the point O on the optical axis LZ of illumination light is equal with the sum for the focal distances $f_{16}$ and $f_3$ for respective lenses, and the distance between the scanning lens 3 and the condensing lens 4 is equal with the focal length $f_3$ of the scanning lens 3. Further, a lens having a focal length, shorter than that of the scanning lens 3 is selected as the scanning lens 4.

In this constitution, when the focusing lens 16 is moved forward and backward along the optical axis LZ of illumination light, since the depth of focus of the optical spot formed by the condensing lens 4 can be moved forward and backward, the depth of focus, when the apparatus is mounted to a microscope or the like, can be adjusted in accordance with the depth of field of the microscope.

Further, since the laser light is focused by the focusing lens 16 on the focal plane FS before the scanning lens 3 and then entered to the scanning lens 3, a satisfactory point light source can be obtained by disposing the pin hole 17 at the focusing position thereof, even in a case where the light can not be restricted sufficiently by the focusing lens 16, the light beam can be shaped easily and, accordingly, a satisfactory optical spot is formed by the condensing lens 4.

The manner, in which the optical spot is displaced in proportion with the amount of movement of the stage 16 and the amount of displacement is reduced to a reduction ratio in accordance with the ratio of the focal length in view of the relation for the focal length: $f_4 < f_3$, is identical with that in the embodiment shown in FIG. 1.

In the foregoing descriptions, while use of the semiconductor laser 7 for the light emission portion has been explained, the present invention is not restricted only to this but any light emitting device or light source such as LED or usual lamp light source can be adopted. Alternatively, an optical fiber for guiding the light from a light source located at a remote position may be used and the light emission end thereof may be used as a light emission portion.

Figure 2:
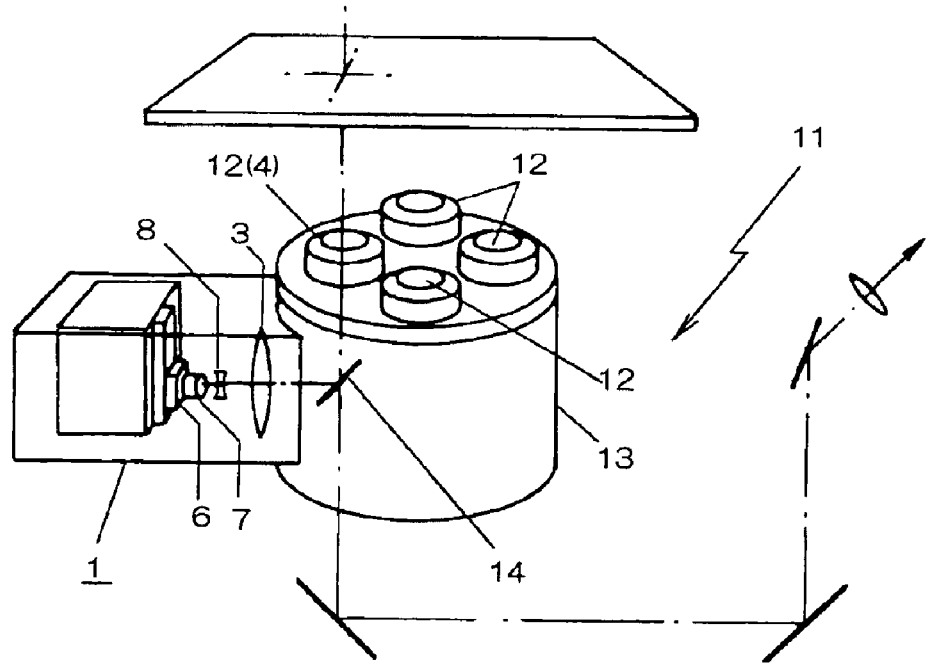
FIG. 2 is an explanatory view showing the state of assembling the apparatus into an inverted microscope.
Figure 4:
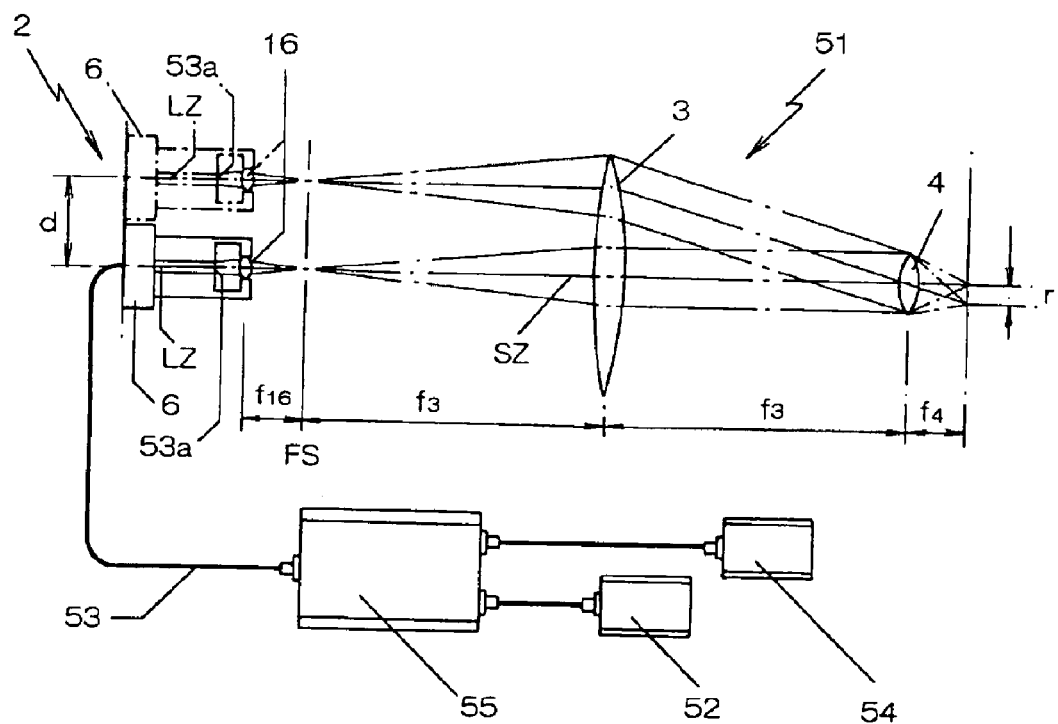
FIG. 4 is an explanatory view showing a further embodiment of the apparatus.
Figure 5:
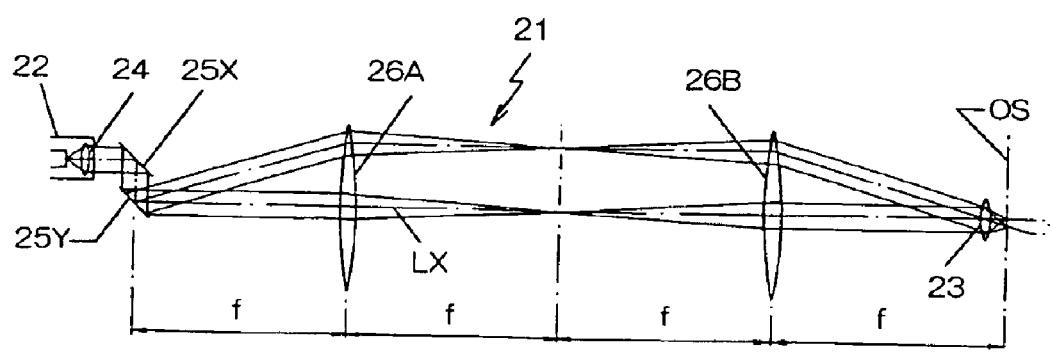
FIG. 5 is an explanatory view showing the apparatus of the prior art.
Figure 6:
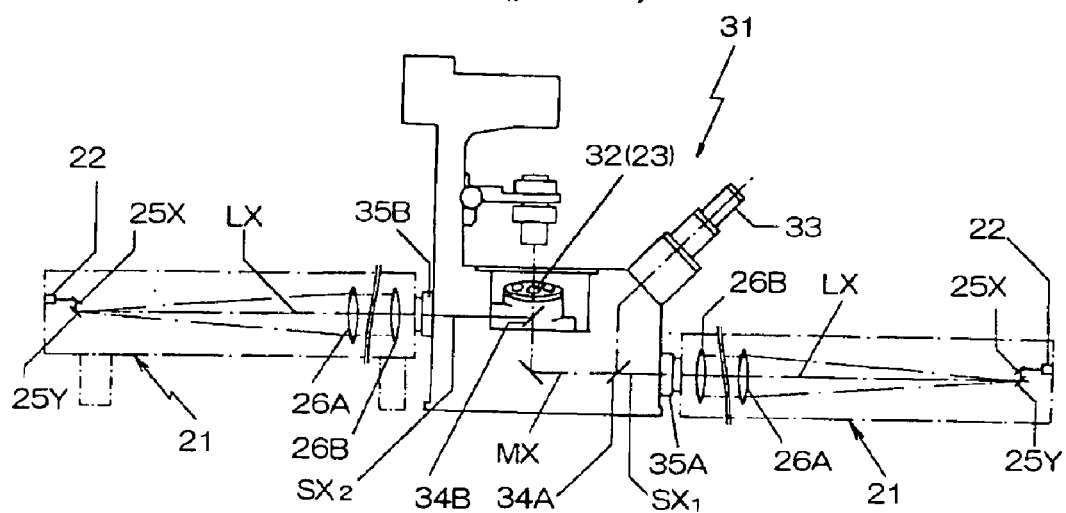
FIG. 6 is an explanatory view showing the state of assembling the apparatus into an inverted microscope.
Figure 7:
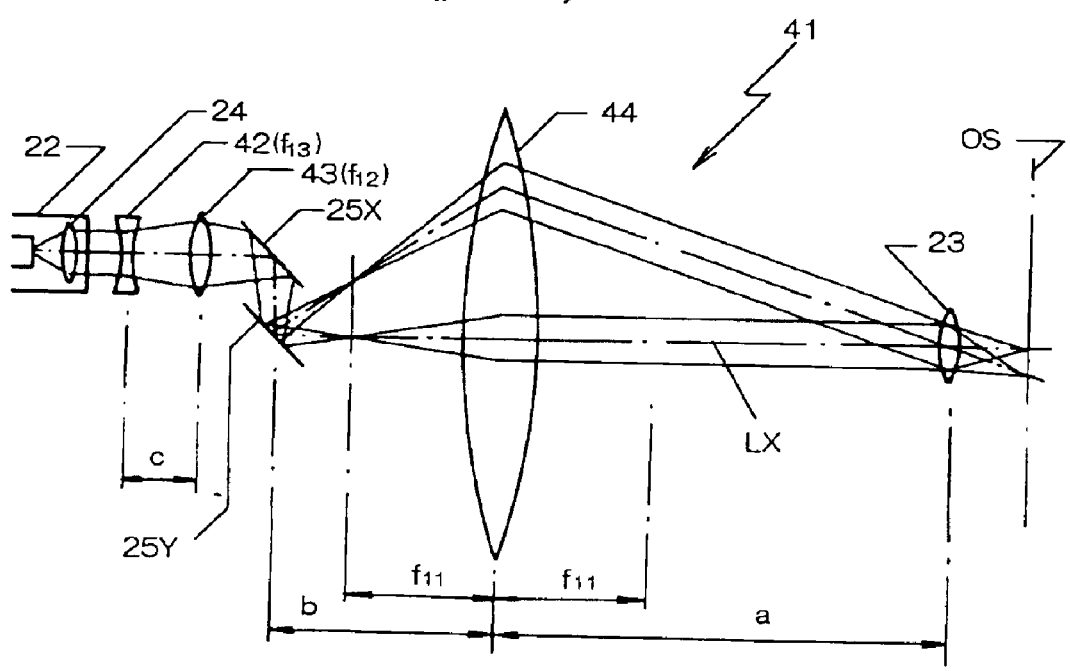
FIG. 7 is an explanatory view showing a reference embodiment.

FIG. 4 shows a further embodiment in which portions in common with those in FIG. 1 to FIG. 3 carry same reference numerals for which detailed descriptions are to be omitted.

In the optical scanning apparatus 51 of this embodiment, the light emission portion of a light source device 2 comprises an optical fiber 53 for emitting an illumination light illuminated from a semiconductor laser (light source) 52, and an end of the fiber as an illumination light emission end 53a is fixed to a stage 6 which is adjustable for the position along the XY plane in perpendicular to the optical axis SZ of the scanning lens 3, with the optical axis LZ of illumination light in parallel with the optical axis SZ.

In the optical fiber 53, an optical brancher 55 is interposed for branching an observed light incident from the illumination light end 53a passing through an identical optical channel with that of the illumination light from the observed surface OS when the illumination light is illuminated to the observed plane OS to an optical detector 54.

For the optical brancher 55, any optical branchers can be used in accordance with the purpose of use such as a wavelength selection coupler for allowing a predetermined optical wavelength to transmit selectively therethrough, a 3 dB coupler that branches a light to a 50%:50% ratio, as well as a multi-mode coupler, a single mode coupler, a wavelength division coupler (including a wave guide channel such as AWG), polarization plane conserving coupler, a variable ratio coupler and a wave guide type optical brancher.

Further, as the optical detector 54, any optical detector can be used depending on the purpose of use such as a photodiode (PD) for detecting an excitation light and fluorescence, secondary photo-multiplier tube (PMT) and a spectralyzer.

Thus, the scanning apparatus 51 can be used as a cofocal microscope for observing an object to be observed placed on the observed plane OS.

That is, when a laser light is illuminated while moving the stage 6 in the direction XY, the laser light is scanned along the surface of the object to be observed placed on the observed surface OS and, when fluorescence at a specified wavelength is caused for instance on the surface of the object to be observed, the fluorescence is entered as an observed light from the illumination light emission end 53a of the optical fiber 53 passing through the identical optical channel with that of the illumination light and branched through the optical brancher 55, and wavelengths and optical intensities thereof is detected by an optical detector 54.

Accordingly, images or cofocal images for the light at any wavelength can be constructed by putting the XY data for the stage 6 and the detected wavelengths and optical intensities to computer processing.

Further, since both of the illumination light and the observed light are guided through the optical fiber 53, the optical channel can be designed freely to facilitate alignment for optical elements such as the semiconductor laser 52, the detector 54 and the optical brancher 55.

Further, a plurality of optical branchers may be interposed to the optical fiber 53, to connect respective branching channels to individual optical detectors, or a variable band path optical fiber filter, an optical isolator or an optical fiber switch may be interposed between the optical brancher 55 and the light source device 2 or the optical detector 54.

Also in this embodiment, not only the semiconductor laser 52 is used as the illumination light source but also any illumination light source such as LED or usual lamp light source may be used depending on the purpose of use for the light source device 2.

Furthermore, a variable light attenuator (VOA) may be interposed in the optical fiber 53 to control the optical amount of the illumination light.

As has been described above, the present invention can provide excellent effects. That is, since the position for the optical spot can be adjusted by the positional adjustment for the light emission portion in the direction XY, control therefor is extremely facilitated and, in addition, since there is no requirement for using the galvano mirrors, no high accuracy is required for the alignment of the optical axes, which can simplify the manufacture and reduce the manufacturing cost. Further, since the number of lenses is decreased, optical axis alignment therefor is facilitated and since one scanning lens may suffice, the size of the entire optical system can be reduced.

The present disclosure relates to subject matter contained in priority Japanese Patent Application No. 2002-53281, filed on Feb. 28, 2002, the contents of which is herein expressly incorporated by reference in its entirety.

What is claimed is:

1. An optical scanning apparatus including an optical system of refracting an illumination light illuminated from a light source device by a scanning lens into parallel optical beams and condensing the light by a condensing lens located at a focal position of the scanning lens on an observed surface, in which the light source device has a light emission portion attached to a stage which is adjustable for the position along an XY plane in perpendicular to the optical axis of the scanning lens, with an optical axis of illumination light being in parallel with the optical axis of the scanning lens.

2. An optical scanning apparatus as defined in claim 1, wherein a concave lens for diverging the illumination light illuminated from the light emission portion and entering the light to the scanning lens is attached integrally with the light emission portion and the concave lens is located between the scanning lens and the focal plane thereof to situate the focal point of the concave lens on the focal plane of the scanning lens on the side of the light source device.

3. An optical scanning apparatus as defined in claim 1, wherein a focusing lens for focusing the illumination light from the light emission portion and then entering the light to the scanning lens is attached integrally to the light emission portion and the focusing lens is disposed such that the focal point of the focusing lens is situated near the focal plane of the scanning lens on the side of the light source device.

4. An optical scanning apparatus as defined in claim 3, wherein the focusing lens is located movably forward and backward along the direction of the optical axis.

5. An optical scanning apparatus as defined in claim 1, wherein the light emission portion of the light source device is comprised of an optical fiber for guiding an illumination light illuminated from an illumination light source, and an optical coupler for branching an observed light returning through an optical channel identical with that for the illumination light from the observed surface to an optical detector is interposed in the optical fiber.

* * * * *